US012792076B2

(12) United States Patent
Kadlimatti

(10) Patent No.: US 12,792,076 B2
(45) Date of Patent: Nov. 10, 2026

(54) BANDGAP VOLTAGE REFERENCE STARTUP CIRCUIT

(71) Applicant: TEXAS INSTRUMENTS INCORPORATED, Dallas, TX (US)

(72) Inventor: Venkatesh Kadlimatti, Hubli (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 75 days.

(21) Appl. No.: 18/393,202

(22) Filed: Dec. 21, 2023

(65) Prior Publication Data

US 2025/0208642 A1 Jun. 26, 2025

(51) Int. Cl.
*G05F 3/26* (2006.01)
*G05F 1/46* (2006.01)
*G05F 3/30* (2006.01)

(52) U.S. Cl.
CPC .............. *G05F 3/262* (2013.01); *G05F 1/468* (2013.01); *G05F 3/30* (2013.01)

(58) Field of Classification Search
CPC ... G05F 3/30; G05F 1/10; G05F 1/567; G05F 3/26; G05F 3/262; G05F 1/468; H02M 1/36
See application file for complete search history.

(56) References Cited

U.S. PATENT DOCUMENTS 6,642,776 B1 * 11/2003 Micheloni ................. G05F 3/30 327/539
6,867,572 B1 3/2005 Lin
2011/0037451 A1 * 2/2011 Shiina ....................... G05F 3/30 323/313
2014/0077777 A1 3/2014 Vemula
2014/0266087 A1 9/2014 Weng
2019/0025868 A1 * 1/2019 Segarra ..................... G05F 3/30
2020/0209906 A1 7/2020 Choi
2023/0127794 A1 * 4/2023 Li ........................... G05F 1/565
2025/0233407 A1 * 7/2025 Chen ....................... G05F 1/468

FOREIGN PATENT DOCUMENTS

CN 115543000 A 12/2022

OTHER PUBLICATIONS

PCT Search Report for PCT/2023/086333 dated Sep. 19, 2024.

* cited by examiner

*Primary Examiner* — Jue Zhang
*Assistant Examiner* — Ularislao Cordova
(74) *Attorney, Agent, or Firm* — Michelle F. Murray; Charles F. Koch

(57) ABSTRACT

A circuit includes a bandgap voltage reference circuit configured to produce a bandgap reference voltage output, a bandgap startup pulldown circuit coupled with the bandgap reference voltage output, configured to hold the bandgap reference voltage output low during a pre-charge phase, and a pre-charge circuit, configured to charge a capacitive node within the circuit during the pre-charge phase.

20 Claims, 9 Drawing Sheets

BANDGAP VOLTAGE REFERENCE STARTUP CIRCUIT

TECHNICAL BACKGROUND

Bandgap voltage reference circuits are temperature independent voltage reference circuits commonly used in integrated circuits to provide a constant voltage regardless of temperature changes, variations in power supply voltages, or changes in their load. They commonly have an output voltage of about 1.21V, corresponding to the band gap of silicon.

Due to their use as a stable voltage reference, any glitches, disruptions, ringing or other noise in their outputs may be unacceptable. During startup of a system including a bandgap voltage reference circuit, it may also be desirable that the output of the bandgap voltage reference circuit smoothly rise to its designed constant voltage output without any glitches, disruptions, ringing or other noise.

SUMMARY

In an implementation, a circuit includes a bandgap voltage reference circuit configured to produce a bandgap reference voltage output, a bandgap startup pulldown circuit coupled with the bandgap reference voltage output, configured to hold the bandgap reference voltage output low during a pre-charge phase, and a pre-charge circuit, configured to charge a capacitive node within the circuit during the pre-charge phase.

In another implementation, a system includes a proportional to absolute temperature (PTAT) current generator and scaling circuit, configured to produce a reference current, and a bandgap voltage reference circuit configured to produce a bandgap reference voltage output.

The system also includes a bandgap voltage sense circuit, configured to compare the bandgap reference voltage output to a threshold voltage, the threshold voltage based at least in part on the reference current, and a pre-charge circuit, configured to pre-charge a capacitive node within the system when a voltage on the capacitive node is less than a voltage of a bias signal, and to pulldown the bandgap reference voltage output when the bandgap reference voltage output is less than the threshold voltage.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following descriptions of various example embodiments and implementations of a startup circuit for a bandgap voltage reference circuit. As discussed above, any glitches, disruptions, ringing or other noise on the output of the bandgap voltage reference circuit is unacceptable, including during startup. To quickly startup a bandgap voltage reference circuit, a startup circuit is used to quickly bring up the bandgap reference voltage output. This startup circuit controls a bandgap adjustment transistor to quickly charge the output node of the bandgap voltage reference circuit and then shuts off once the bandgap reference voltage output reaches a threshold voltage based at least in part on a reference current.

However, as described in detail below, in some embodiments, there still may be ringing and glitches on the bandgap reference voltage output during startup. Example embodiments described herein include the use of a pulldown to temporarily pulldown the output node of the bandgap voltage reference circuit, and a pre-charge circuit to pre-charge certain high-capacitance nodes within the system during startup. This pulldown transistor ensures that the bandgap reference voltage does not have an overshoot until proper biasing of internal high capacitive nodes are completed.

This provides for a smooth startup of the bandgap voltage reference circuit without any glitches or ringing on its output. This provides a technical advantage of providing a reference voltage to various circuits in a system without any undesirable transients even during startup of the system.

Figure 1:
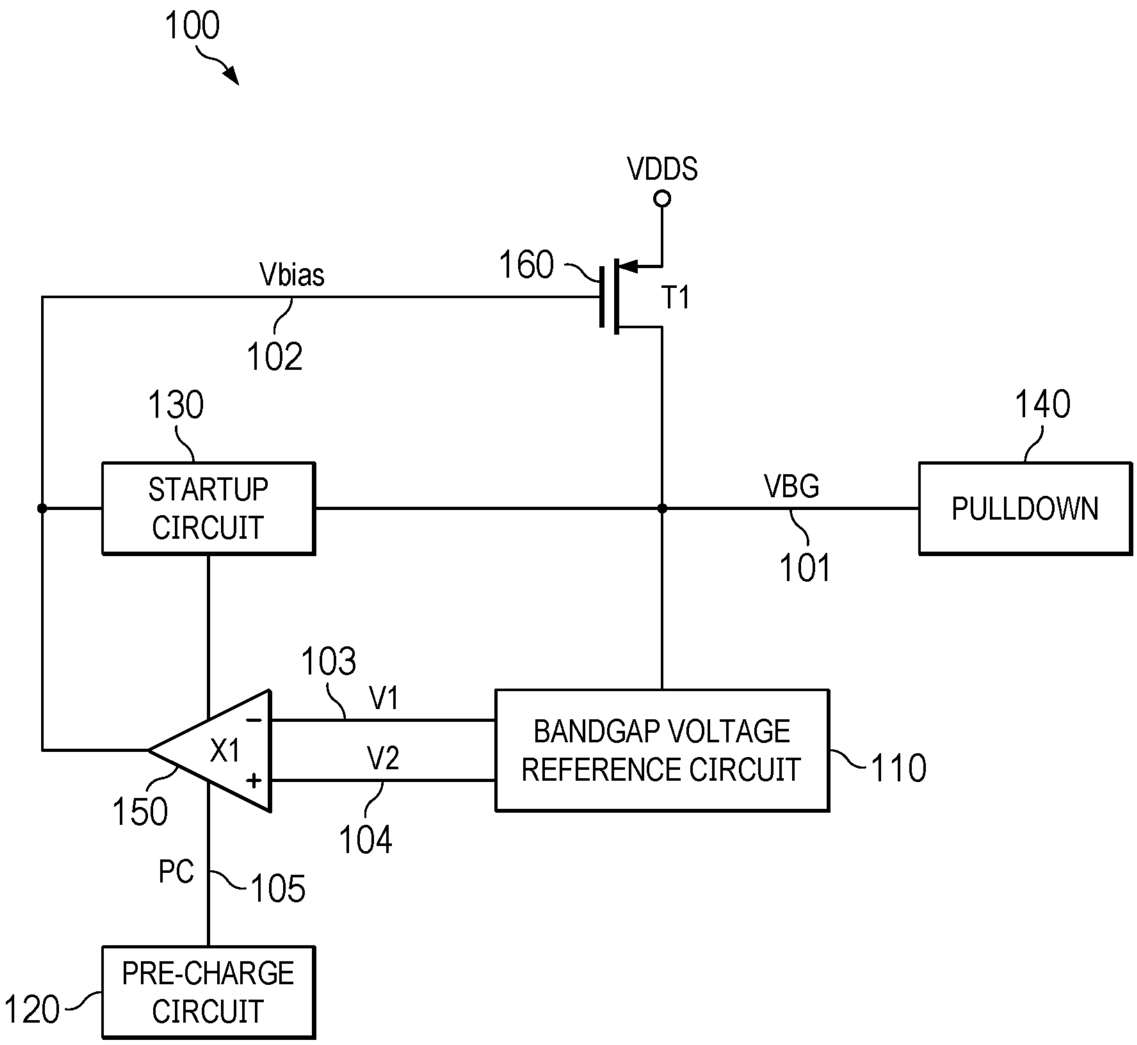
FIG. 1 illustrates an example embodiment of a startup circuit for a bandgap voltage reference circuit.

FIG. 1 illustrates an example embodiment of a startup circuit 100 for a bandgap voltage reference circuit 110. In this example embodiment a startup circuit 100 includes bandgap voltage reference circuit 110, pre-charge circuit 120, startup circuit 130, pulldown 140, error amplifier X1 150, and bandgap adjustment transistor T1 160.

Figure 4:
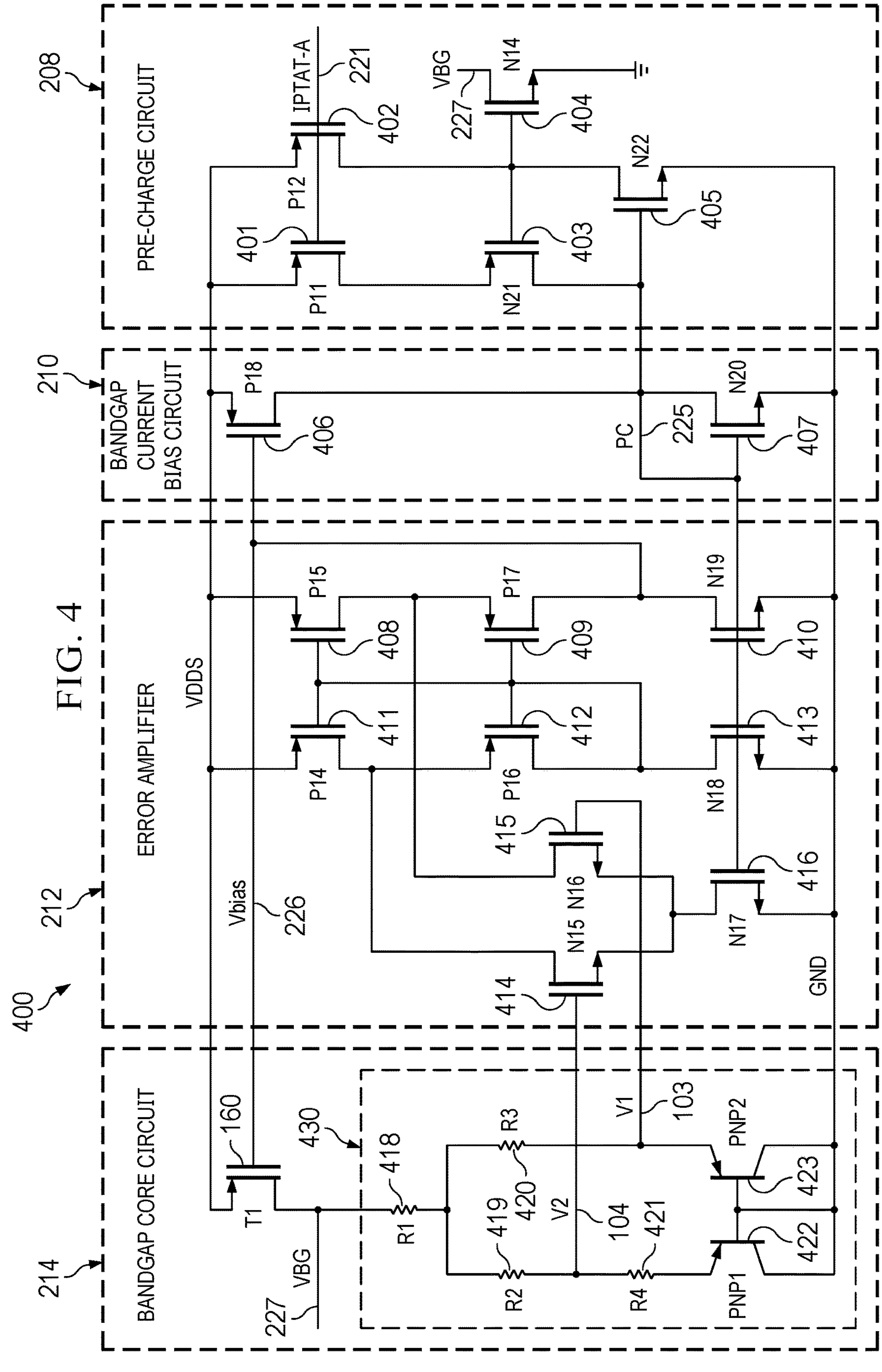
FIG. 4 illustrates example embodiments of the pre-charge circuit, the bandgap current bias circuit, the error amplifier, and the bandgap core circuit from FIG. 2.

The bandgap voltage reference circuit 110 includes a first bandgap voltage output V1 103, a second bandgap voltage output V2 104, and a bandgap reference voltage output VBG 101. The production of first bandgap voltage output V1 103 and second bandgap voltage output V2 104 is illustrated in FIG. 4, and described in detail below.

The error amplifier X1 150 includes a first input coupled with the first bandgap voltage output V1 103, and a second input coupled with the second bandgap voltage output V2 104. In some embodiments, error amplifier X1 150 is an operational amplifier configured to output a bias signal Vbias 102 based at least in part on the first bandgap voltage output V1 103 and the second bandgap voltage output V2 104.

The bandgap adjustment transistor T1 160 includes a gate coupled with the bias signal Vbias 102, a source coupled with power supply VDDS, and a drain coupled with the bandgap reference voltage output VBG 101.

The startup circuit 130 includes an input coupled with the bandgap reference voltage output VBG 101 and an output coupled with the gate of the bandgap adjustment transistor T1 160. During a startup phase, the startup circuit 130 is configured to pulldown the gate of the bandgap adjustment transistor T1 160.

The pulldown circuit 140 is coupled with the bandgap reference voltage output VBG 101, and is configured to hold the bandgap reference voltage output VBG 101 low during a pre-charge phase. In some example embodiments, pulldown circuit 140 is a pulldown transistor connected to a ground.

The pre-charge circuit 120 is coupled with the error amplifier X1 150, and configured to charge one or more capacitive nodes within the error amplifier X1 150 during the pre-charge phase.

During startup, the power supply VDDS slowly rises and the startup circuit 130 pulls the gate of the bandgap adjustment transistor T1 160 to ground until the bandgap reference voltage output VBG 101 rises. Since the bandgap reference voltage output VBG 101 node has low capacitance, it rises quickly. Once the bandgap reference voltage output VBG 101 rises past a threshold value, the startup circuit 130 releases the gate of the bandgap adjustment transistor T1 160 and allows the remainder of the circuit to operate normally.

However, when the startup circuit 130 releases the gate of the bandgap adjustment transistor T1 160, the error amplifier X1 150 may not have started its normal, stable operation and may not be driving the bias signal Vbias 102 to the gate of the bandgap adjustment transistor T1 160. This causes the bandgap adjustment transistor T1 160 to open, which allows the bandgap reference voltage output VBG 101 to drop. Once the bandgap reference voltage output VBG 101 drops below the threshold value, the startup circuit 130 again pulls the gate of the bandgap adjustment transistor T1 160 to ground, opening the bandgap adjustment transistor T1 160 and driving the bandgap reference voltage output VBG 101 from the power supply VDDS. Depending on the speed that the error amplifier X1 150 begins operation, this ringing of the bandgap reference voltage output VBG 101 may be severe.

In this example embodiment, the startup phase is divided into two phases; first a pre-charge phase, then the remainder of the startup phase. During the pre-charge phase, the gate of T1 160 and VBG 101 are pulled low. VBG 101 is pulled low until one or more high capacitive nodes inside error amplifier 150 pre-charge to a required voltage, and then the remainder of the startup phase continues. In the startup phase, the VBG 101 pulldown 140 is turned off resulting in VBG 101 rising and then the startup circuit 130 disables itself by releasing the gate of T1 160 (Vbias 102).

To prevent ringing of the bandgap reference voltage output VBG 101, pulldown circuit 140 is added to the circuit and configured to pulldown the bandgap reference voltage output VBG 101 during the pre-charge phase so that the error amplifier X1 150 has time to pre-charge its internal high capacitance nodes. Once the pre-charge phase is complete, pulldown circuit 140 is configured to release the bandgap reference voltage output VBG 101, beginning the remainder of the startup phase. In the remainder of the startup phase, the bandgap reference node rises, and disables the startup circuit 130, and then normal operation of the bandgap voltage reference circuit 110 begins.

Figure 2:
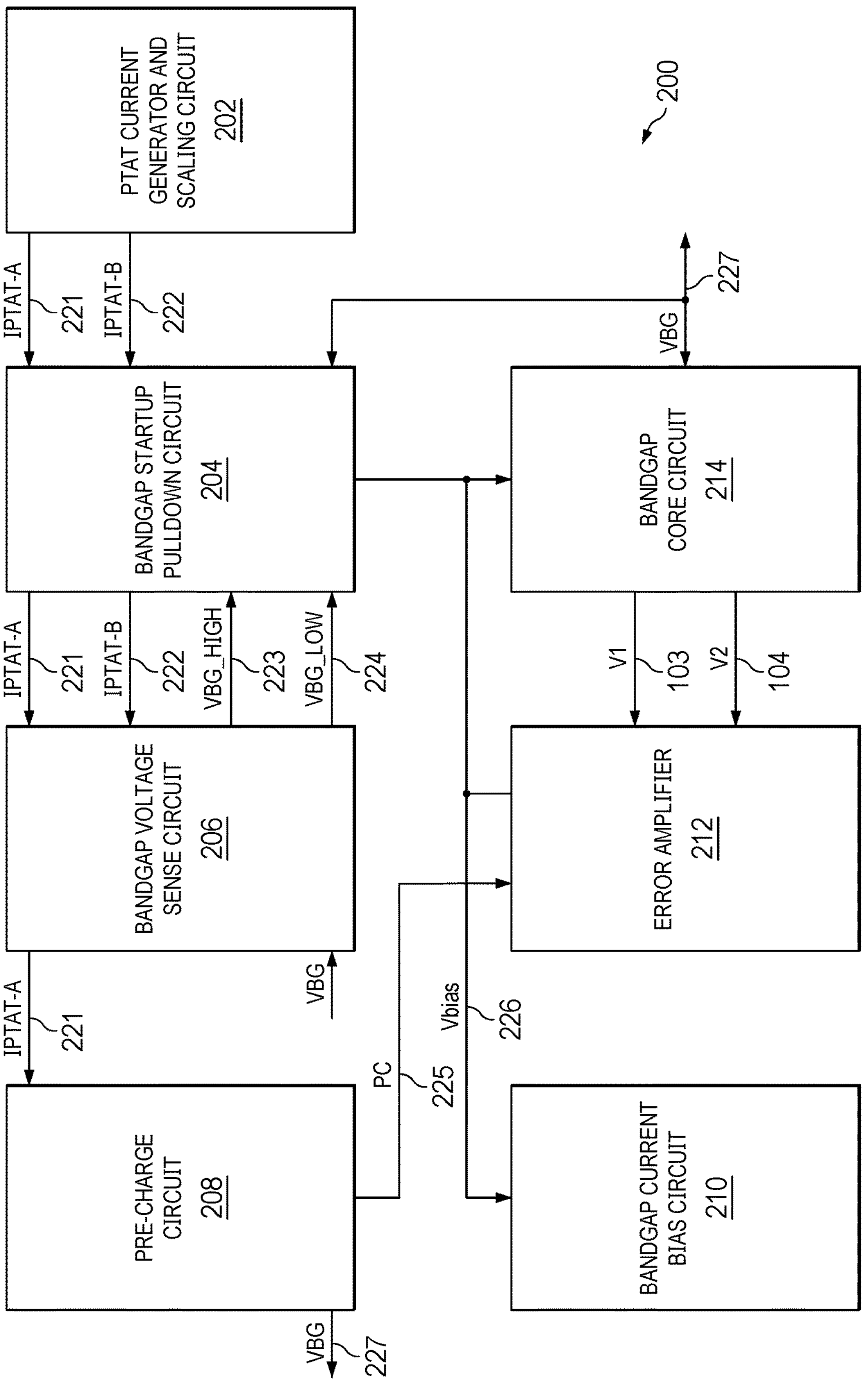
FIG. 2 illustrates an example embodiment of a startup system for a bandgap core circuit.

FIG. 2 illustrates an example embodiment of a startup system 200 for a bandgap core circuit 214. In this example embodiment, startup system 200 includes proportional to absolute temperature (PTAT) current generator and scaling circuit 202, bandgap startup pulldown circuit 204, bandgap voltage sense circuit 206, pre-charge circuit 208, bandgap current bias circuit 210, error amplifier 212, and bandgap core circuit 214.

The proportional to absolute temperature (PTAT) current generator and scaling circuit 202, is configured to produce a scaled reference voltage or current (or both). In this example embodiment, PTAT current generator and scaling circuit 202 produces signals IPTAT-A 221 and IPTAT-B 222 corresponding to a reference current that is proportional to the absolute temperature. Signals IPTAT-A 221 and IPTAT-B 222 are used by other circuits within the startup system 200 to control current mirrors which provide currents mirroring the reference current within the PTAT current generator and scaling circuit 202 that is proportional to the absolute temperature. Signal IPTAT-A 221 controls p-type transistors and signal IPTAT-B 222 controls n-type transistors configured as current mirrors within other circuits in the startup system 200. These current mirrors duplicate the reference current from PTAT current generator and scaling circuit 202.

This reference current acts as a current for pre-charging high capacitance nodes within error amplifier 212, and as a reference current for comparing bandgap reference voltage output VBG 227.

In various configurations, the PTAT current generator and scaling circuit 202 is capable of producing either reference currents, reference voltages, or both for use throughout the other circuits. Various circuits within startup system 200 use either reference currents, reference voltages, or both, as reference voltages may be produced from reference currents and vice versa.

The bandgap core circuit 214 has a first bandgap voltage output V1 103, a second bandgap voltage output V2 104, and a bandgap reference voltage output VBG 227. The production of first bandgap voltage output V1 103 and second bandgap voltage output V2 104 is illustrated in FIG. 4, and described in detail below.

The error amplifier 212 has a first input coupled with the first bandgap voltage output V1 103 and a second input coupled with the second bandgap voltage output V2 104. It is configured to output a bias signal Vbias 226 based at least in part on the first bandgap voltage output V1 103 and the second bandgap voltage output V2 104.

The bandgap core circuit 214 may include a bandgap adjustment transistor (e.g., transistor T1 160 of FIG. 4), that has a gate coupled with the bias signal Vbias 226, a source coupled with a power supply, and a drain coupled with the bandgap reference voltage output VBG 227.

The bandgap voltage sense circuit 206 is configured to compare the bandgap reference voltage output VBG 227 to a threshold voltage. In this example embodiment, the threshold voltage is represented by signals IPTAT-A 221 and IPTAT-B 222 which are outputs of the PTAT current generator and scaling circuit 202 and correspond to a reference current that is proportional to the absolute temperature within the PTAT current generator and scaling circuit 202 and are used in current mirrors within other circuits in the startup system 200 and to compare with the bandgap reference voltage output VBG 227 dependent current within the bandgap voltage sense circuit 206. The bandgap reference voltage dependent current is generated by connecting the bandgap reference voltage output VBG 227 to the gate of N9 320.

Low and high voltages of the bandgap reference voltage output VBG 227 are detected by generating a current which is dependent on the bandgap reference voltage output VBG 227 and is compared with the reference current. The current comparator output is a digital logic signal. In this example embodiment, the threshold voltage is based on the reference current and the threshold voltage of transistor N9 320 of FIG. 3, described in more detail below, within the bandgap voltage sense circuit 206. In this example embodiment, the bandgap voltage sense circuit 206 compares the bandgap reference voltage output VBG 227 dependent current (the current through transistor N9 320) to the reference current (within a current mirror controlled by signals IPTAT-A 221 and IPTAT-B 222) and produces outputs VBG_HIGH 223 and VBG_LOW 224 which are used by bandgap startup pulldown circuit 204 to pulldown the gate of the bandgap adjustment transistor T1 160 when the bandgap reference voltage output is less than the reference voltage. VBG_HIGH 223 and VBG_LOW 224 are logically opposite, and are used to control a transmission gate illustrated in FIG. 3 and described in detail below.

During the pre-charge phase, the pre-charge circuit 208 is configured to pre-charge a capacitive node PC 225 within the error amplifier 212 when a voltage on the capacitive node is less than a voltage of the bias signal Vbias 226, and to pulldown the bandgap reference voltage output VBG 227 when the bandgap reference voltage output VBG 227 is less than the predetermined threshold voltage as determined by the bandgap voltage sense circuit 206.

Figure 3:
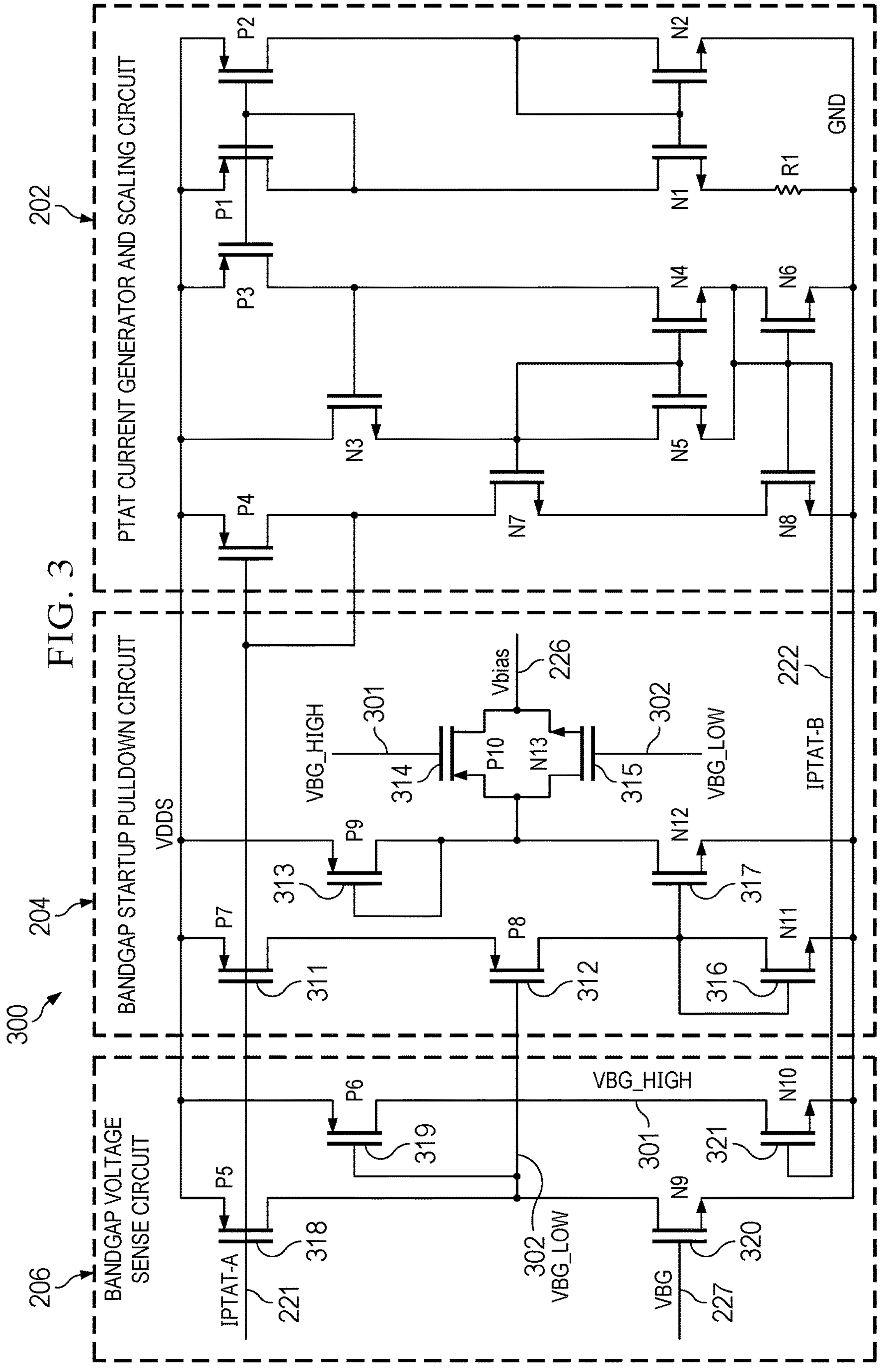
FIG. 3 illustrates example embodiments of the proportional to absolute temperature (PTAT) current generator and scaling circuit, the bandgap startup pulldown circuit, and the bandgap voltage sense circuit from FIG. 2.

FIG. 3 illustrates example embodiments of the proportional to absolute temperature (PTAT) current generator and scaling circuit 202, the bandgap startup pulldown circuit 204, and the bandgap voltage sense circuit 206 from FIG. 2. These three circuits are a portion 300 of the startup system 200 from FIG. 2. All three circuits are powered by power supply VDDS and coupled to ground, GND.

In this example embodiment, PTAT current generator and scaling circuit 202 includes transistors P1-P4 and N1-N8, along with resistor R1. It is configured to produce a reference current proportional to the absolute temperature and supply a reference voltage corresponding to that current to other circuits within the startup system 200. In this embodiment the reference voltage includes two signals IPTAT-A 221 and IPTAT-B 222 that are used by current mirrors in other circuits to produce currents corresponding to the reference current within PTAT current generator and scaling circuit 202. IPTAT-A 221 and IPTAT-B 222 are also used in a comparison with the bandgap reference voltage output VBG 227 within the bandgap voltage sense circuit 206 to determine when the bandgap reference voltage output VBG 227 is less than the reference voltage.

Bandgap voltage sense circuit 206 includes transistors P5 318, P6 319, N9 320, and N10 321. It receives the bandgap reference voltage output VBG 227 which is coupled with the gate of N9 320 from the bandgap core circuit 214. It also receives IPTAT-A 221 and IPTAT-B 222 from the PTAT current generator and scaling circuit 202 and uses them to compare VBG 227 to a reference voltage corresponding to the reference current proportional to the absolute temperature. It produces outputs VBG_HIGH 301 and VBG_LOW 302 that are used to control a transfer gate (P10 314 and N13 315) within bandgap startup pulldown circuit 204.

Bandgap startup pulldown circuit 204 includes transistors P7 311, P8 312, P9 313, P10 314, N11 316, N12 317 and N13 318. Transistors P10 314 and N13 315 form a transfer gate controlled by signals VBG_HIGH 301 and VBG_LOW 302 and configured to pulldown Vbias 226 when the transfer gate is open.

FIG. 4 illustrates example embodiments of the pre-charge circuit 208, the bandgap current bias circuit 210, the error amplifier 212, and the bandgap core circuit 214. from FIG. 2. These four circuits are a portion 400 of the startup system 200 from FIG. 2. All four circuits are powered by VDDS and coupled to ground GND.

In this example embodiment, pre-charge circuit 208 includes transistors P11 401, P12 402, N14 404, N21 403, and N22 405. N14 404 is configured to pull VBG 227 to ground when activated. Pre-charge circuit 208 receives control signal IPTAT-A 221 from the PTAT current generator and scaling circuit 202 and uses it to pre-charge high capacitive nodes within error amplifier 212. When activated, pre-charge circuit 208 drives the pre-charge signal PC 225 to pre-charge the gates of transistors N17 416, N18 413, and N19 410 within error amplifier 212.

The bandgap current bias circuit 210 includes transistors P18 406 and N20 407. P18 406 mirrors the bandgap current flowing through T1 160 and causes it to flow through N20 407. N2 407 mirrors this current into N17 416, N18 413, and N19 410 which in turn set bias currents within error amplifier 212.

Error amplifier 212 includes transistors P14 411, P15 408, P16 412, P17 409, N15 414, N16 415, N17 416, N18 413, and N19 410. During startup the gates of transistors N17 416, N18 413, and N19 410 are pre-charged by pre-charge circuit 208. The error amplifier 212 has a first input (the gate of N16 415) coupled with the first bandgap voltage output V1 103 and a second input (the gate of N15 414) coupled with the second bandgap voltage output V2 104. It is configured to output a bias signal Vbias 226 based at least in part on the first bandgap voltage output V1 103 and the second bandgap voltage output V2 104. In some embodiments, the error amplifier 212 is implemented as an operational amplifier circuit.

Bandgap core circuit 214 includes a bandgap voltage reference circuit 430 such as bandgap voltage reference circuit 110 from FIG. 1. The bandgap voltage reference circuit 430 includes a pair of transistors, PNP1 422 and PNP2 423, along with four resistors R1 418, R2 419, R3 420, and R4 421 configured to produce the bandgap reference voltage output VBG 227. It also includes a bandgap adjustment transistor T1 160 that has a gate coupled with the bias signal Vbias 226, a source coupled with a power supply VDDS, and a drain coupled with the bandgap reference voltage output VBG 227. It also provides the first bandgap voltage output V1 103, and the second bandgap voltage output V2 104 to error amplifier 212.

In this example embodiment, transistors PNP1 422 and PNP2 423 are identical, and resistors R1 418, R2 419, R3 420, and R4 421 are selected to produce substantially different currents through transistors PNP1 422 and PNP2 423. Some example embodiments are configured to produce a 10:1 ratio of currents through transistors PNP1 422 and PNP2 423. The difference between these currents corresponds to a difference between the first bandgap voltage output V1 103, and the second bandgap voltage output V2 104. Each of the voltage outputs has a temperature coefficient. Error amplifier 212 provides feedback to bandgap core circuit 214 via Vbias 226 which controls the overall current through transistors PNP1 422 and PNP2 423 resulting in the bandgap reference voltage output VBG 227 having a very low temperature coefficient.

Figure 5:
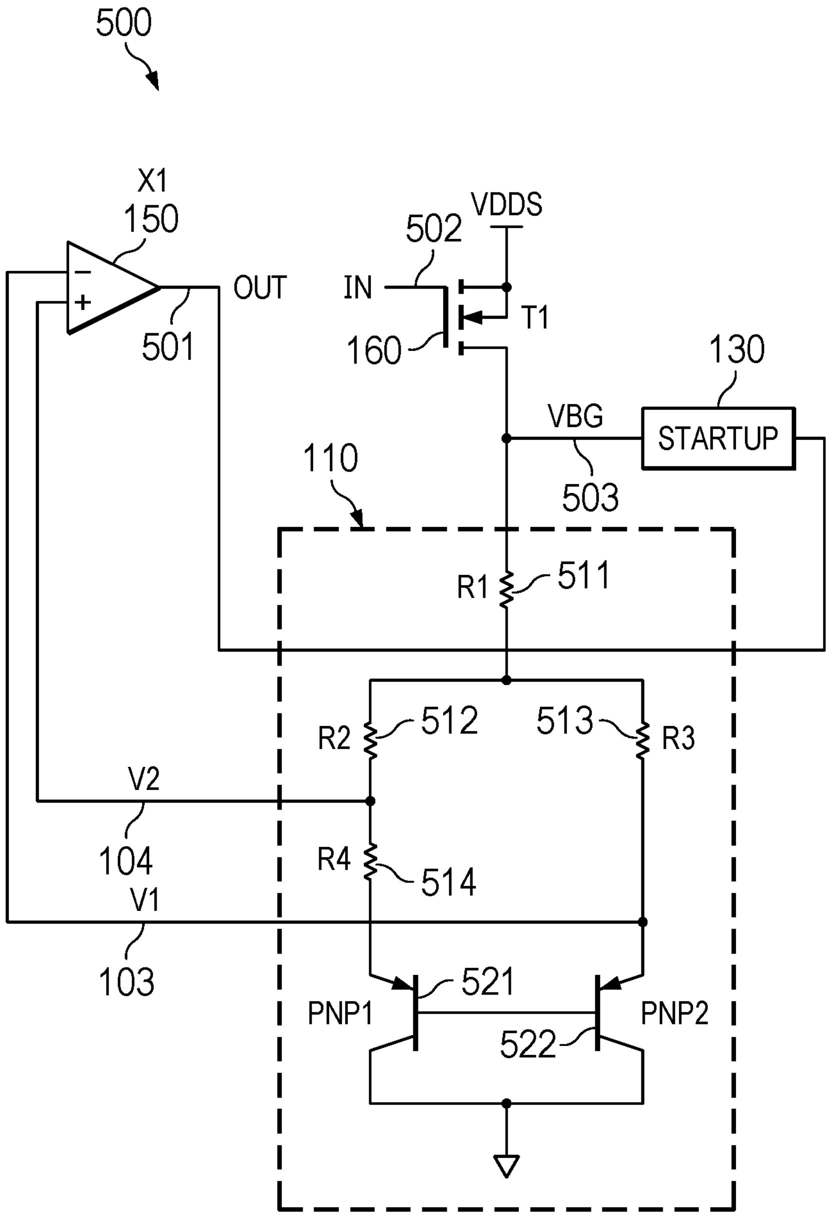
FIG. 5 (PRIOR ART)
FIG. 5 illustrates an example embodiment of a test circuit for simulating the startup of the bandgap voltage reference circuit from FIG. 1.

FIG. 5 illustrates an example embodiment of a test circuit 500 for simulating the startup of the bandgap voltage reference circuit 110 from FIG. 1. This example test circuit is provided to demonstrate why both a pulldown circuit 140 and a pre-charge circuit 120 may be beneficial in some applications to provide a bandgap reference voltage output VBG 503 free from any glitches, ringing, or other noise during startup of the system.

This example test circuit 500 includes the bandgap voltage reference circuit 110, error amplifier 150, startup circuit 130, and bandgap adjustment transistor T1 160, all from FIG. 1. In this test circuit 500 the bias signal Vbias is disconnected between the output of the error circuit X1 150 and the gate of the bandgap adjustment transistor T1 160. The output of the error circuit X1 150 is coupled with the output of the startup circuit 130 and is labeled as OUT 501. The input to the gate of the bandgap adjustment transistor T1 160 is labeled as IN 502. In some simulations, a voltage ramp is applied to IN 502 and OUT 501 is monitored along with several other nodes and currents within the test circuit 500.

Figure 6:
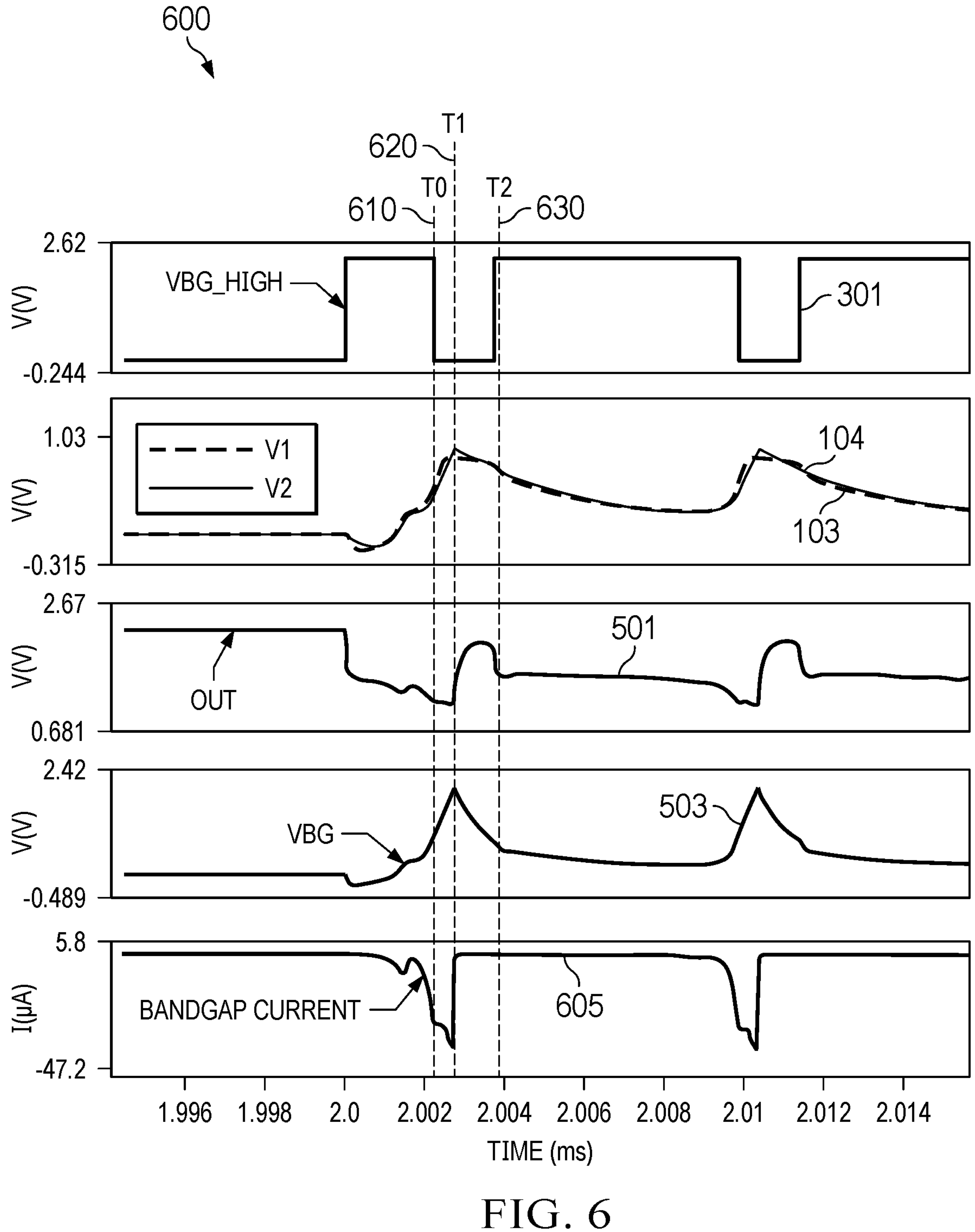
FIG. 6 (PRIOR ART)
FIG. 6 illustrates example simulation results from the test circuit from FIG. 5.

FIG. 6 illustrates example simulation results 600 from the test circuit 500 from FIG. 5. In this example closed loop simulation, IN 502 and OUT 501 are coupled together and the startup circuit does not include pre-charge circuit 120 and pulldown circuit 140 from FIG. 1. In this simulation, VBG_HIGH 301, V1 103, V2 104, OUT 501, VBG 503, and bandgap current 605 are graphed. Bandgap current 605 is the current flowing through T1 160 from its drain to source. VBG_HIGH 301 controls the startup circuit 130. During the startup phase, VBG_HIGH 301 is high and the startup circuit 130 is active, pulling Vbias 102 low, turning on transistor T1 160 allowing VDDS to charge the bandgap reference voltage output VBG 503. At time TO 610 VBG 503 is greater than or equal to a threshold voltage of the startup circuit 130, and VBG_HIGH 301 goes low, turning off the startup circuit 130 and allowing the error amplifier 150 to drive the gate of T1 160.

However, due to capacitive nodes within the error amplifier 150, the output OUT 501 of the error amplifier 150 has not yet stabilized enough to properly drive the gate of T1 160, and the bandgap adjustment transistor T1 160 remains open further driving up the bandgap reference voltage output VBG 503.

At time T1 610 of the simulation, the error amplifier 150 fails to regulate the bandgap loop, OUT 501 quickly rises, and the error amplifier 150 turns off the bandgap adjustment transistor T1 160, and because of this, VBG 503 begins to drop below the threshold voltage for the startup circuit 130. Once the bandgap reference voltage output VBG 503 drops below the threshold value, the startup circuit 130 again pulls the gate of the bandgap adjustment transistor T1 160 to ground, opening the bandgap adjustment transistor T1 160 and driving the bandgap reference voltage output VBG 503 from the power supply VDDS. Depending on the speed that the error amplifier X1 150 begins operation, this ringing of the bandgap reference voltage output VBG 503 may be severe.

Figure 7:
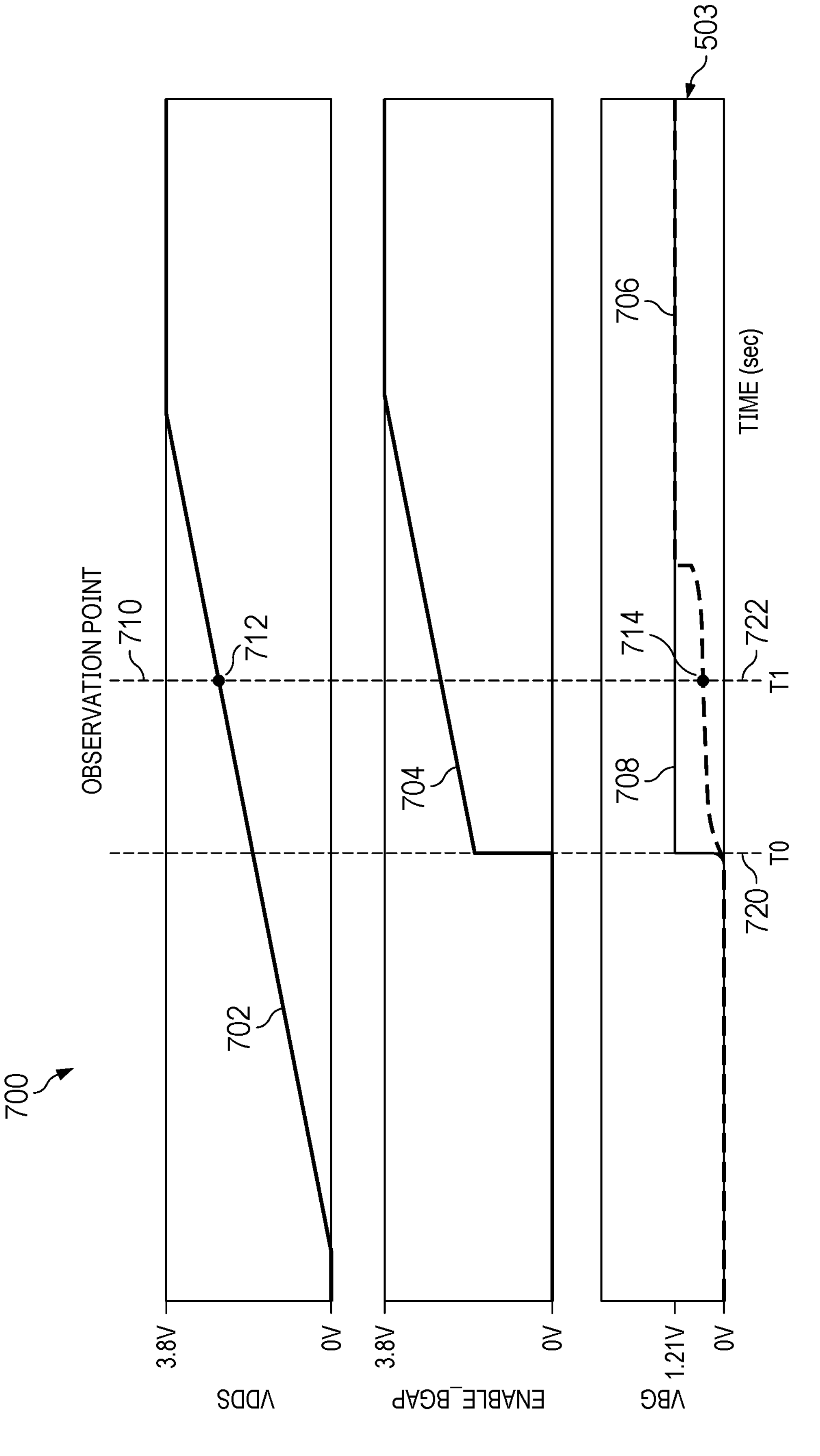
FIG. 7 (PRIOR ART)
FIG. 7 illustrates example simulation results from the test circuit from FIG. 5.

FIG. 7 illustrates example simulation results 700 from the test circuit 500 from FIG. 5. In this example closed loop simulation, IN 502 and OUT 501 are coupled together and the startup circuit does not include pre-charge circuit 120 and pulldown circuit 140 from FIG. 1. In this simulation, the power supply VDDS 702 is ramped from 0V to 3.8V. At time TO 720, the power supply voltage VDDS crosses a power supply threshold voltage and Enable_BGAP 704 is enabled and tracks VDDS for the remainder of the simulation. Enable_BGAP 704 is the signal that enables operation of the bandgap voltage reference and is illustrated in state 904 in FIG. 9 and described below.

In a first simulation, VBG 503 is illustrated in curve 706 and is seen to rise slowly from 0V to its normal operational value of 1.21V over a period of time. At observation point 710 and time T1 722, VBG 503 has only risen to 473 mV at point 714 while, VDDS has risen to 2.533V at point 712. Voltages at this observation point 710 may be undesirable as they may lead to multiple stable operating points as illustrated in FIG. 8 and described below.

In a second simulation, VBG 503 is illustrated in curve 708 after pre-charge circuit 120 and pulldown 140 from FIG. 1 have been added to the circuit of FIG. 5 and the Vbias 102 node is pulled to a very low voltage. In this simulation, VBG 503 is seen to quickly rise to its stable, desired value of 1.21V very shortly after time TO 720 once Enable_BGAP is enabled. This removes the possibility of multiple stable operating points as illustrated in FIG. 8.

Figure 8:
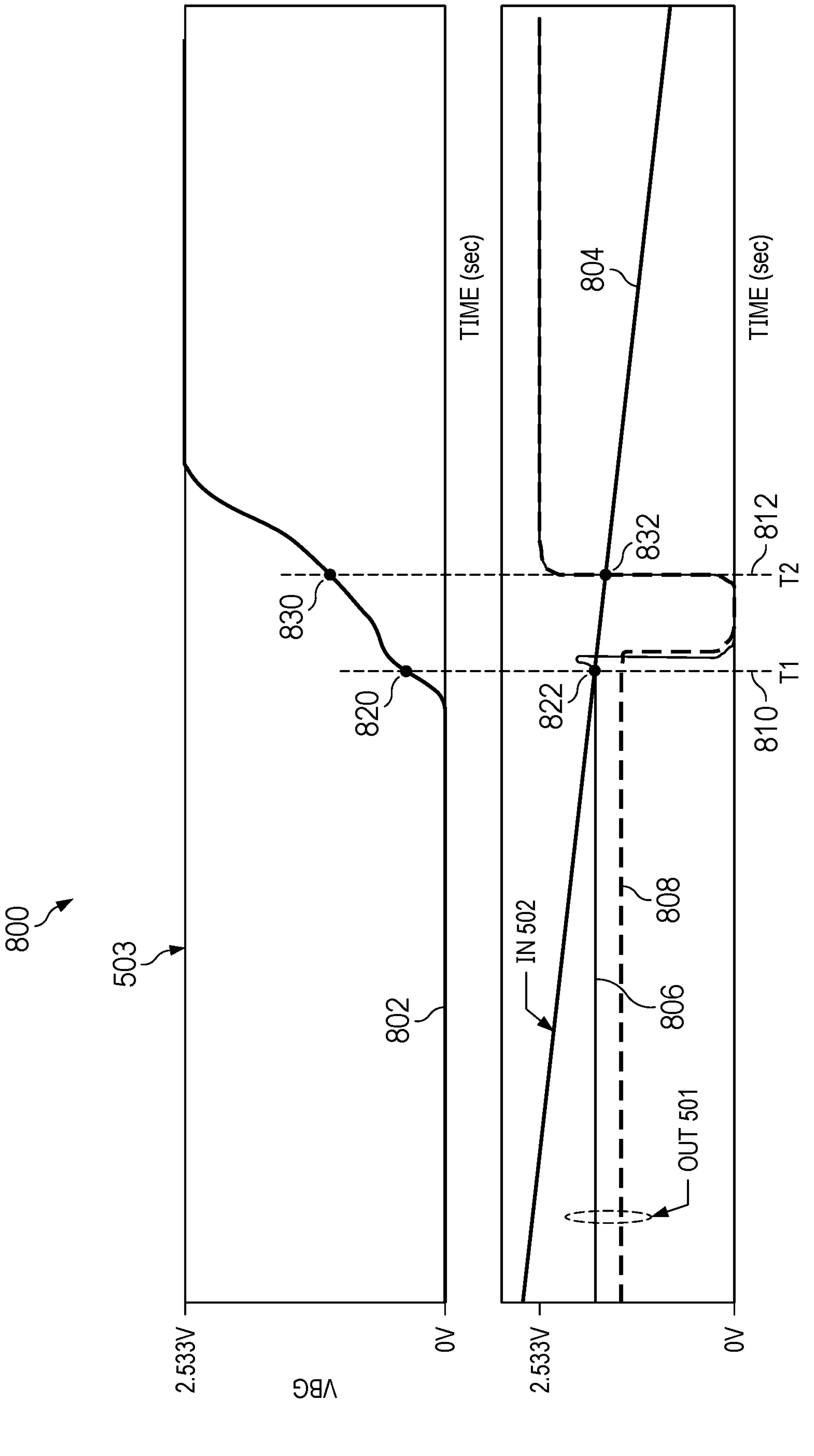
FIG. 8 (PRIOR ART)
FIG. 8 illustrates example simulation results from the test circuit from FIG. 5.

FIG. 8 illustrates example simulation results 800 from the test circuit 500 from FIG. 5. In this example open loop simulation, IN 502 and OUT 501 are separated. In this simulation, performed at the observation point 710 from FIG. 7, VDDS is set to 2.533V while IN 502 is ramped down from 2.533V to 0V, and VBG 503 and the output OUT 501 of error amplifier 150 are simulated.

In this example simulation, the input IN 502 to the gate of the bandgap adjustment transistor T1 160 is ramped from a high voltage (2.533V) to ground, and the output OUT 501 of the error amplifier 150, is simulated in curve 806 where it is seen to briefly spike above the input IN 502 to the gate of the bandgap adjustment transistor T1 160 at point 822, resulting in a potentially undesirable operating point, where VBG 503 is at 473 mV at point 820. Another potentially undesirable operating point occurs when OUT 501 drops back across IN 502. At time T2 812, OUT 501 stabilizes at 2.533V, crossing IN 502 at point 832, corresponding to a desired operating point with VBG 503 at 1.21V at point 830.

In a second simulation, OUT 501 is illustrated in curve 808 after pre-charge circuit 120 and pulldown 140 from FIG. 1 have been added to the circuit of FIG. 5 and also P9 313 is made weaker so that Vbias 102 is pulled to a lower voltage during the entire startup phase. In this simulation, OUT 501 only crosses IN 502 at the desired operating point 832, removing the possibility of multiple stable operating points.

Figure 9:
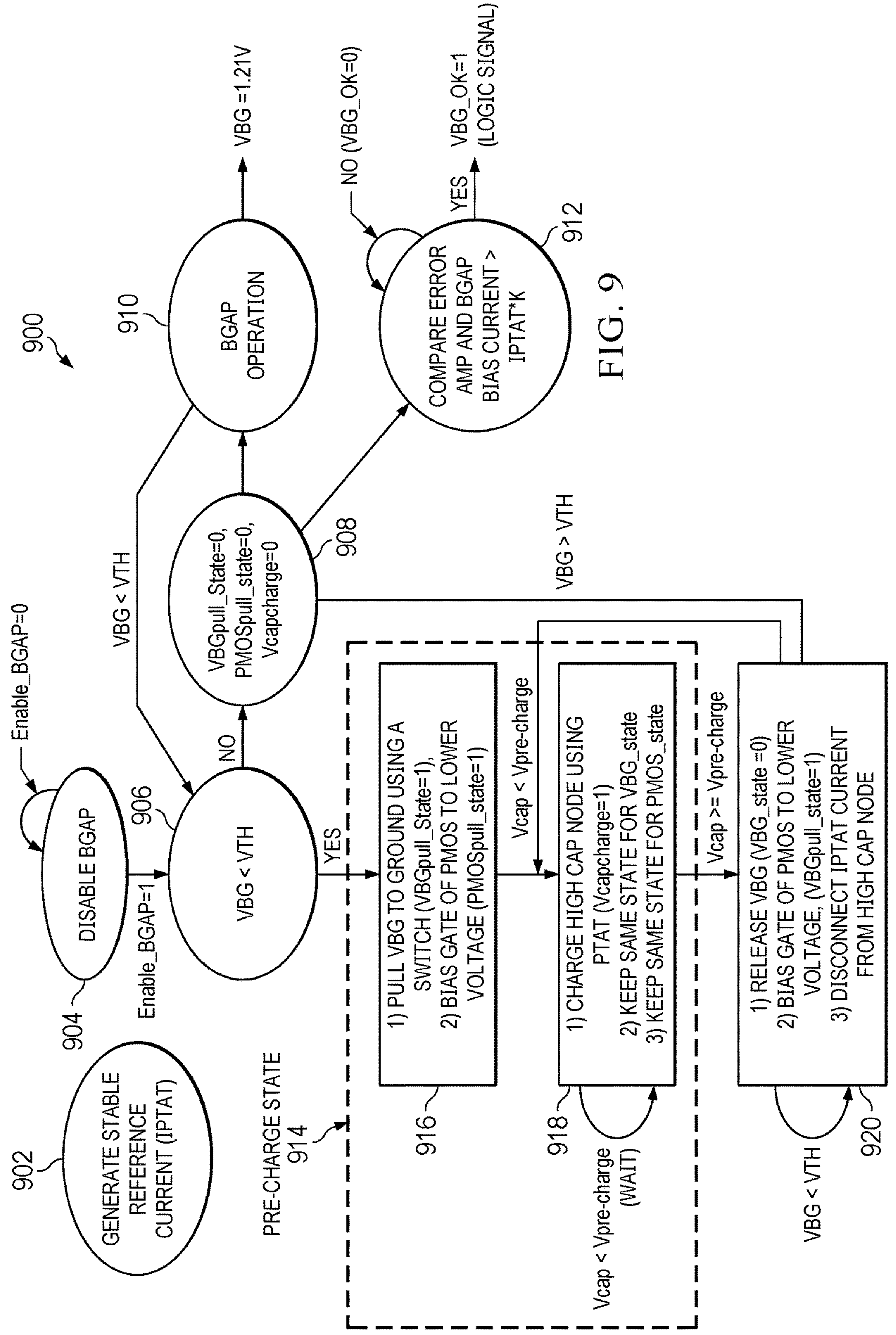
FIG. 9 illustrates an example embodiment of a state machine diagram for controlling a startup circuit for a bandgap voltage reference circuit.

FIG. 9 illustrates an example embodiment of a state machine diagram 900 for controlling a startup circuit 200 for a bandgap core circuit 214. State machine diagram 900 is provided to illustrate the operation of the circuits from FIGS. 2-4. In an example embodiment, no actual state machine exists, it is used here as an example visualization of the operation of the circuits from FIGS. 2-4. Other example embodiments may include a control circuit for startup circuit 200 operating as a state machine illustrated in FIG. 9. In this example state machine diagram, initially at state 902, PTAT current generator and scaling circuit 202 generates a stable reference voltage, and current and signals IPTAT-A 221 and IPTAT-B 222 throughout all of the remaining states within state machine diagram 900.

At initial state 904, the bandgap core circuit 214 is disabled and Enable_BGAP is low. When the power supply VDDS crosses a power supply threshold voltage, Enable_BGAP is enabled, control transfers to state 906 while the bandgap reference voltage output VBG 227 is compared to the predetermined threshold voltage. If the bandgap reference voltage output VBG 227 is greater to or equal than the predetermined threshold voltage control is passed to state 908, which will be described further below.

If the bandgap reference voltage output VBG 227 is less than the predetermined threshold voltage, pre-charge states 914 are initiated and control passes to state 916, where the bandgap reference voltage output VBG 227 is pulled to ground by the pulldown transistor N14 404 of FIG. 4 in pre-charge circuit 208, and the bias signal Vbias 226 pulls down the gate of the bandgap adjustment transistor T1 160 of FIG. 3. In state 918, pre-charge circuit 208 uses the stable reference current to charge capacitive nodes (e.g., Vcap—the gates of transistors N17 416, N18 413, and N19 410 of FIG. 4) within error amplifier 212 until the voltage on the capacitive nodes is greater than or equal to a pre-charge threshold voltage, Vpre-charge, at which point control transfers to state 920.

In state 920, pulldown transistor N14 404 of FIG. 4 in pre-charge circuit 208 releases the bandgap reference voltage output VBG 227, the bias signal Vbias 226 is pulled down which pulls down the gate of the bandgap adjustment transistor T1 160 using the P10 314 and N13 315 transfer gate, and the pre-charge circuit 208 disconnects the stable reference current from the capacitive nodes within error amplifier 212. Once the bandgap reference voltage output VBG 227 is greater to or equal than the threshold voltage normal operation is initiated in state 908 where the P10 314 and N13 315 transfer gate turns off, releasing the bias signal Vbias 226, the error amplifier 212 takes control of the bias signal Vbias 226, and normal operation begins in state 910.

State 912 is used to compare the output of error amplifier 212 and a bandgap bias current to a multiple of the reference current from PTAT current generator and scaling circuit 202. While the output of error amplifier 212 and the bandgap bias current are greater than the multiple of the reference current from PTAT current generator and scaling circuit 202, the bandgap core circuit 214 is functioning correctly and the signal VBG_OK is asserted. Otherwise, the signal VBG_OK is de-asserted indicating an error condition.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above may be combined in various ways to form multiple embodiments. As a result, the invention is not limited to the specific embodiments described above, but only by the claims and their equivalents.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same terminals. For example, a resistor or capacitor shown and described herein as a single component may instead be multiple resistors or capacitors, respectively, coupled in series between the same two terminals as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. A circuit comprising:

a bandgap voltage reference circuit configured to produce a bandgap reference voltage at an output;

a bandgap startup pulldown circuit coupled to the output of the bandgap voltage reference circuit, the bandgap startup pulldown circuit configured to hold the bandgap reference voltage at the output of the bandgap voltage reference circuit low during a pre-charge phase; and a pre-charge circuit, configured to, during the pre-charge phase:

receive a voltage of a bias signal; and in response to determining that a voltage at a capacitive node within the circuit is less than the voltage of the bias signal, charge the capacitive node within the circuit.

2. The circuit of claim 1, wherein the output of the bandgap voltage reference circuit is a first output, the bandgap reference voltage is a first bandgap reference voltage, the bandgap voltage reference circuit configured to produce a second bandgap reference voltage at a second output of the bandgap voltage reference circuit, the circuit further comprising:

an error amplifier having a first input coupled to the first output of the bandgap voltage reference circuit and a second input coupled to a second output of the bandgap voltage reference circuit, the error amplifier configured to produce the bias signal at an output based at least in part on the first output of the bandgap voltage reference circuit and the second output of the bandgap voltage reference circuit.

3. The circuit of claim 2, further comprising:

a bandgap adjustment transistor having a gate coupled to the output of the error amplifier, a source coupled to a power supply terminal, and a drain coupled with the first output of the bandgap reference voltage circuit.

4. The circuit of claim 3, further comprising:

a startup circuit having an input coupled to the first output of the bandgap voltage reference circuit and an output coupled to the gate of the bandgap adjustment transistor, the startup circuit configured to pulldown the gate of the bandgap adjustment transistor during a startup phase.

5. The circuit of claim 4, wherein the startup circuit, the bandgap startup pulldown circuit, and the pre-charge circuit are turned off following the startup phase.

6. The circuit of claim 1, wherein the bandgap startup pulldown circuit comprises a pulldown transistor.

7. The circuit of claim 2, wherein the error amplifier is an operational amplifier.

8. The circuit of claim 2, wherein the capacitive node is within the error amplifier, and the bandgap startup pulldown circuit is configured to release the first output of the bandgap reference voltage circuit after the capacitive node within the error amplifier has been pre-charged.

9. The circuit of claim 8, further comprising a proportional to absolute temperature (PTAT) current generator and scaling circuit, configured to produce a reference voltage.

10. The circuit of claim 9, wherein the pre-charge phase ends when the bandgap reference voltage is greater than the reference voltage.

11. The circuit of claim 10, wherein the pre-charge circuit uses a proportional to absolute temperature reference current from the PTAT current generator and scaling circuit to pre-charge the capacitive node within the error amplifier.

12. The circuit of claim 2, wherein the bandgap voltage reference circuit comprises a first PNP transistor having a first emitter to collector current and a second PNP transistor having a second emitter to collector current.

13. The circuit of claim 12, wherein the first emitter to collector current is different from the second emitter to collector current during normal operation.

14. The circuit of claim 12, wherein the first output of the bandgap voltage reference circuit corresponds to the first PNP transistor and the second output of the bandgap voltage reference circuit corresponds to the second PNP transistor.

15. A system comprising:

a proportional to absolute temperature (PTAT) current generator and scaling circuit, configured to produce a reference current;

a bandgap voltage reference circuit configured to produce a bandgap reference voltage;

a bandgap voltage sense circuit, configured to compare the bandgap reference voltage to a threshold voltage, the threshold voltage based at least in part on the reference current; and a pre-charge circuit, configured to pre-charge a capacitive node within the system while a voltage on the capacitive node is less than a voltage of a bias signal, and to pulldown the bandgap reference voltage while the bandgap reference voltage is less than the threshold voltage.

16. The system of claim 15, wherein the pre-charge circuit comprises a pulldown transistor configured to pulldown the bandgap reference voltage while the bandgap reference voltage is less than the threshold voltage.

17. The system of claim 16, wherein the pulldown transistor is configured to release the bandgap reference voltage while a voltage of the capacitive node is greater than or equal to a voltage of the bias signal.

18. The system of claim 15, wherein the pre-charge circuit uses the reference current to pre-charge the capacitive node.

19. The system of claim 15, wherein the threshold voltage is based on the reference current and a threshold voltage of a transistor within the bandgap voltage sense circuit.

20. The system of claim 16, wherein the pulldown transistor is configured to release the bandgap reference voltage after the capacitive node has been pre-charged.

* * * * *